United States Patent [19]
Tomko

[11] Patent Number: 5,878,240
[45] Date of Patent: Mar. 2, 1999

[54] SYSTEM AND METHOD FOR PROVIDING HIGH SPEED MEMORY ACCESS IN A MULTIPROCESSOR, MULTIMEMORY ENVIRONMENT

[75] Inventor: Lawrence Andrew Tomko, Warrenville, Ill.

[73] Assignee: Lucent Technologies, Inc., Murray Hill, N.J.

[21] Appl. No.: 791,302

[22] Filed: Jan. 30, 1997

Related U.S. Application Data

[63] Continuation of Ser. No. 439,030, May 11, 1995, abandoned.

[51] Int. Cl.⁶ .................................................. G06F 13/14
[52] U.S. Cl. ........................ 395/311; 395/309; 395/287; 395/729; 711/148; 711/150
[58] Field of Search .................................. 395/287, 293, 395/299, 311, 728–730, 856, 858, 474–475, 477; 711/147–148, 150

[56] References Cited

U.S. PATENT DOCUMENTS

| | | | |
|---|---|---|---|
| 4,209,839 | 6/1980 | Bederman | 395/475 |
| 4,495,567 | 1/1985 | Treen | 395/287 |
| 4,760,521 | 7/1988 | Rehwald et al. | 395/433 |
| 4,807,184 | 2/1989 | Shelor | 395/311 |
| 4,837,682 | 6/1989 | Culler | 395/294 |
| 5,129,093 | 7/1992 | Muramatsu et al. | 395/800 |
| 5,136,500 | 8/1992 | Lemay et al. | 395/250 |
| 5,182,808 | 1/1993 | Bagnoli et al. | 395/299 |
| 5,237,686 | 8/1993 | Asano et al. | 395/650 |
| 5,283,870 | 2/1994 | Joyce et al. | 395/479 |
| 5,287,485 | 2/1994 | Umina et al. | 395/447 |
| 5,471,592 | 11/1995 | Gove et al. | 395/300.03 |

*Primary Examiner*—Meng-Ai T. An
*Assistant Examiner*—Sumati Lefkowitz

[57] ABSTRACT

A processing system comprising a plurality of processors and a plurality of memories, wherein each processor is connected to a memory by a primary bus. When one processor needs to access another processor's memory, it requests access to that particular memory. A bus control monitors memory transactions and causes the processor for this target memory to relinquish the memory. The bus controller then configures a transfer bus and forwards the memory access command to the target memory such that the processor can then access its target memory in addition to its own memory. This configuration remains stable until any processor requests a memory outside of the current configuration or the processor associated with the target memory requests its own memory again. Advantageously, the bus control uses an arbitration table which provides equitable access to all memories.

5 Claims, 5 Drawing Sheets

SYSTEM AND METHOD FOR PROVIDING HIGH SPEED MEMORY ACCESS IN A MULTIPROCESSOR, MULTIMEMORY ENVIRONMENT

This application is a continuation of application Ser. No. 08/439,030, filed on May 11, 1995 now abandoned.

TECHNICAL FIELD

This invention relates to the field of high-speed data processing systems, and, more specifically to a system and method for providing high-speed memory access to a multiprocessor data processing system.

BACKGROUND OF THE INVENTION

General purpose processors are becoming increasingly common in applications that required special purpose processors only a few years ago. Previously, only special purpose processors had the power needed to perform complex tasks (i.e., these processors were usually optimized to perform a specific type of function, such as complex number calculations or vector arithmetic). A major problem with special purpose processors is that their cost per unit is very high and they have to be redesigned and re-implemented in order to take advantage of improvements in the art. As general purpose processors become faster and are able to do more, the cost savings of general purpose processors in many applications far outweighs the benefits of special purpose processors. One such application that can benefit from such cost reduction is digital signal processing.

Digital signal processing is used in diverse applications in diverse industries. For example, the telephone industry is using digital signal processing in applications such as recognition of spoken telephone numbers, credit card numbers, name recognition for telephone dialing, and speaker verification for credit card authorization. The computer industry is using digital signal processing in applications such as word recognition in speech-to-text applications, command control, and speaker verification for authorization of use. Two universal problems faced by all digital signal processing applications are that it requires large amounts of processing power and large amounts of high-speed memory.

In current architectures, digital signal processing is primarily performed by dedicated digital signal processing integrated circuits. Such digital signal processors are usually designed for one task alone, that is, performing all of the multiplications, accumulations, and comparisons necessary to provide the speech-to-text, word spotting, or speaker verification required by the application. Such single-function processors are expensive to make, because every change or improvement requires a new integrated circuit to be designed. Since the industry is moving so rapidly, such designs are constantly churning through the manufacturing process.

Digital signal processing is also very memory intensive. Large amounts of data are stored to be processed for each particular application. In addition, there are usually one or more large data dictionaries for comparison to digitized speech in order to provide the word spotting, text-to-speech, etc. As a result, very large memory structures are used in digital signal processing applications.

Such dedicated processing and large memory structures generally require complex bus structures in order to connect everything together and to coordinate complex operations, such as loading the memory with the speech to be recognized/verified, processing the speech and comparing it to known samples. These structures are even more complex when there is more than one digital signal processor working on the speech at the same time, as is frequently the case.

Therefore, a problem in the art is that there is no inexpensive digital signal processor and memory structure which can provide the processing abilities of dedicated digital signal processors without the cost of custom design.

SUMMARY OF THE INVENTION

This problem is solved and a technical advance is achieved in the art by a digital signal processing system and method which employs "off-the-shelf" components while providing high-speed memory access and distributed processing. An apparatus, according to this invention, comprises a plurality of processors and a plurality of memories. Each processor is connected to one of the memories by a primary bus. In general, each processor freely accesses its respective memory as needed. According to this invention, each memory comprises a unique address spectrum. When one processor needs to access another processor's memory, or alternatively, a memory not associated with a processor, it merely addresses that particular memory. A bus control monitors memory transactions from all processors and, upon seeing a memory transaction with an address outside of the spectrum assigned to that processor's respective memory, causes the processor associated with this target memory to temporarily relinquish its memory access. Then the bus control configures a transfer bus and forwards a memory access command to the target memory such that the source processor can then access the target memory as well as its own memory. This configuration remains active until any of the processors requests a memory address outside of the current configuration or the processor associated with the target memory requests its own memory again. In response, the bus control again causes the transfer bus to be reconfigured. Advantageously, the bus control uses an arbitration table which provides equitable access to the memories. Advantageously, each processor may access its own memory at least 50% of the time (every other memory cycle). In this manner, high speed processor operation may be achieved using off-the-shelf components. Furthermore, digital signal processing functionality may be achieved by including an I/O processor which receives and transmits digital signals to be or having been processed and, upon notifying the bus control, may transfer digital signals to or from one of the plurality of memories so that digital signals can be processed by the plurality of processors.

BRIEF DESCRIPTION OF THE DRAWING

A more complete understanding of the invention may be obtained from consideration of the following description in conjunction with the drawings in which.

DETAILED DESCRIPTION

Figure 1:
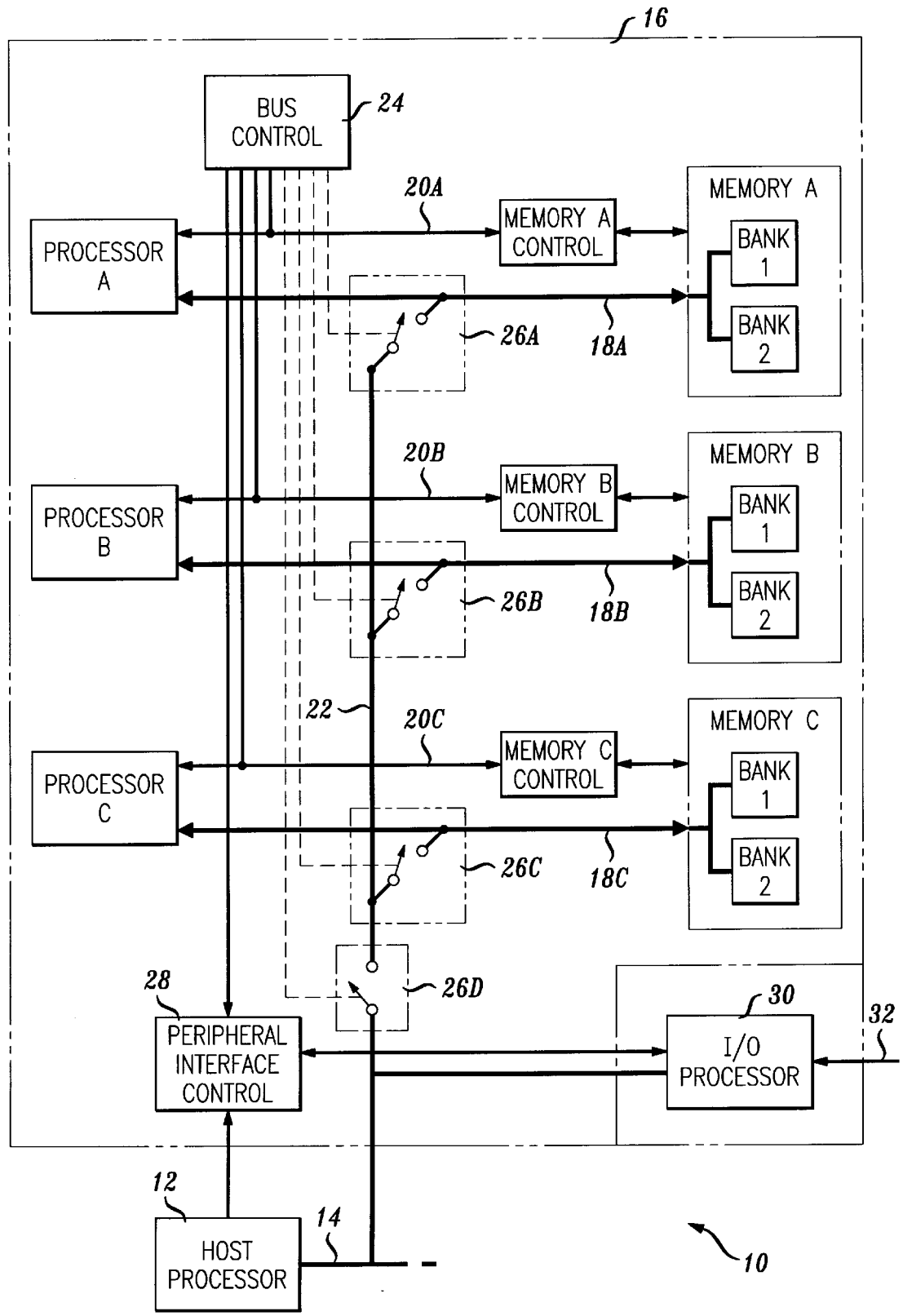
FIG. 1 is a block diagram of a digital signal processing system according to an exemplary embodiment of this invention.

FIG. 1 illustrates a block diagram of a digital signal processor system according to an exemplary embodiment of this invention. However, this invention may also be applicable to other multiprocessor systems wherein multiple memories are used. Therefore, this invention is not to be construed (in its broadest application) to be limited to a digital signal processing context. This invention is illustrated in the context of a general purpose computer 10, such as a personal computer (PC). PCs, as known in the art, generally comprise a host processor 12 connected to a bus 14. In the exemplary embodiment of this invention, bus 14 comprises an ISA bus, as is known in the art. Host processor 12 is thus an INTEL 80486 or similar processor. As is known in the art, if host processor 12 is a Pentium® processor as manufactured by the INTEL Corporation, bus 14 is a PCI bus as is known in the art. PC 10 also includes a keyboard, video display terminal, video card, and other such devices as are all well known in the art and, therefore, not shown in order to clearly illustrate this invention.

A processing system according to this invention is illustrated as one circuit card 16, which plugs into bus 14. The processing system is thus viewed by host processor 12 as one peripheral located on bus 14. This system, according to the exemplary embodiment of this invention comprises three processors, labeled here as A, B, and C, and three sets of memories, memory A, memory B, and memory C, each associated with a respective processor. In this exemplary embodiment, processors A, B, and C each comprise Motorola Power PC-604 processors. These processors perform four hundred million instructions per second (MIPs) or two hundred million floating point operations per second (mega FLOPs), counting the common digital signal processing operation of "multiply and accumulate" as two operations. According to an exemplary embodiment of this invention, board 16 is designed such that some of the processors and/or memories may be omitted. Not equipping one or more processors and memories results in a less-expensive, less-powerful board with the same printed wiring and overall design.

Memories A, B, and C each comprise 16 megabytes of synchronous dynamic random access memory (SDRAM), each having a controller (memory controller A, memory controller B, and memory controller C, respectively) that allow full-speed, burst-mode access by the processors, thus providing a maximum sustainable throughput of 422 megabytes per second in this exemplary embodiment. As will be described further below, each memory address is unique. That is, memory A's address spectrum is different from memory B's and memory B's is different from memory C's. In this manner, each processor may access any memory by issuing a memory address without having to know which of memory A, memory B or memory C contains the address. Also in this exemplary embodiment, each processor may address its own memory by using a unique address range.

According to this exemplary embodiment of this invention, each processor is connected to its respective memory by a bus, 18A, 18B, and 18C, respectively. Advantageously, in the normal operating mode each processor may access its respective memory exclusively so that access is provided as needed. Each processor issues commands to its memory and receives acknowledgements, etc., via a set of control lines 20A, 20B, and 20C. There is also a clock on board 16 (not shown for clarity) operating at 65.536 MHz in this exemplary embodiment. This clock speed was chosen to operate at the speed of the bus; but, when faster circuits become available, the bus could operate at higher speeds.

When a processor wishes to access memory (either a read or write) it issues a transaction start signal and the memory address for the beginning of the transaction (within 9.5 nanoseconds after the rising edge of the clock pulse). The transaction start signal lasts only one clock pulse (15 nanoseconds). The rest of the control signals remain until the processor receives an "address acknowledge" signal from its memory controller. However, according to this exemplary embodiment, the processor may issue another transaction start signal as soon as two clock pulses after receiving the address acknowledge signal without having transferred any data. Thus, multiple transactions can be active on the bus system. The Motorola 604 supports three such transactions, but only two transactions are supported according to this exemplary embodiment; two being sufficient to pump data back and forth between the processor and the memory as fast as the processor can deal with it.

Each of memory A, B, and C is divided in this exemplary embodiment into two banks of 8 megabytes each. When an address is received, the address indicates which of the two banks of memory is to be accessed. The controller issues a command to its memory indicating the bank to be accessed and the remainder of the address. A few clock pulses later, the controller issues an address acknowledgment to the processor and sends the read or write command to the memory. For a write transaction, the controller returns a transaction acknowledge signal to the processor on the same clock pulse as the write control is sent to the memory, indicating the acceptance of the data. For a burst write (that is, a write that involves more than one address location), the controller continues to send the transaction acknowledge signal to the processor on each of several following clock signals, and the memory accepts data on each of these clock signals. For a read operation, there is a two-clock pulse delay before the address acknowledge signal is sent to the processor, indicating the availability of data. For a burst read operation (when several blocks of data are read at the same time), the signal is sent for each of the several cycles and valid data is presented to the processor on each of these clock cycles.

In both cases, the total cycle time is dependent on the burst length. However, each processor may issue a first transaction start for one bank of its SDRAM memory, and then, after receipt of the address acknowledge signal, immediately issues another transaction start. Thus, one clock pulse after the last data transaction acknowledge is issued for one bank, a first data transaction acknowledge can be issued for the other. If the addresses alternate between the banks, the controller can issue four double words of data every five clock pulses, which is as fast as the processors used in this exemplary embodiment can handle the data.

There are many situations where it is desirable for one processor to access another processor's memory. For example, it is common to have data dictionaries or sound dictionaries distributed among the three memories in order to distribute the memory space utilization so that a large data dictionary does not take up most of the space in one specific memory, and to prevent one specific memory from being accessed continuously by all processors. To this end, there is a transfer bus 22 which interconnects all processors by interconnecting the memory busses 18A, 18B, and 18C and PC bus 14. In order to avoid contention on the bus, there is a bus control system 24 which will be described below in connection with FIGS. 2 and 3. Bus control 24 monitors the signals on control leads 20A, 20B, and 20C for situations where a processor issues a transaction start signal with a memory address of a memory other than its own. If, for example, processor A issues a transaction start with an address within the range of memory B, bus control 24 causes processor B to cease accessing its memory and then allows processor A to access memory B. To this end, there are a plurality of switches 26A, 26B, 26C, and 26D, under control of bus control 24, which cause a pair of connections to be made between a requesting processor and transfer bus 22 and between transfer bus 22 and the target memory.

A peripheral interface control 28 determines when a peripheral such as host processor 12 wants to access transfer bus 22. This occurs, for example, upon initialization when memories A, B, and C are first pumped with data.

Furthermore, there is an I/O processor 30 connected to transfer bus 22. I/O processor receives incoming data to be processed via line 32. In this exemplary embodiment I/O processor 30 is a daughter card to circuit card 16, thus permitting transfer of data at a high rate. One skilled in the art could easily connect I/O processor 30 to bus 14 without departing from the scope of this invention. I/O processor 30, in this preferred embodiment, is assumed to comprise a digital interface to a telephone system, such as, for example, an I/O processor receiving data at multiples of 64 kilobits per second over line 32.

Thus, a one-card, multichannel signal processing system that can be upgraded and used in place of an expensive dedicated digital signal processing chip and associated expensive static memory may be implemented on a personal computer. The interaction of bus control 24, as it negotiates permission among the processors for each other's memory, is described in connection with FIGS. 2–5.

As mentioned above, bus control 24 provides permission negotiation among processors A, B, C and PC-I/O when one of them wants to access another processor's memory. Bus control 24, according to the exemplary embodiment of this invention, allows no more than one pair of connections to transfer bus 22 to occur at one time. In this exemplary embodiment, bus control 24 provides a "round robin" arbitration system. That is, whichever processor used the bus for access to another's memory last is placed on the end of the priority queue the next time there is contention. Otherwise, the bus control 24 uses an alphabetical system (processor A, processor B, processor C, I/O-PC) to arbitrate among the four contenders, but also guarantees each processor 50% of the accesses to its own memory, if needed.

In general, each processor is always connected to its own memory and normally the processor is always granted access to its respective bus 18 by bus control 24. Furthermore, the first indication that a processor wants to access another's memory is the issuance of a transaction start with the other's memory address. Because the transaction start signal is transient, the arbiter receives it, stores it, and decides whether to grant the transfer bus to the requester. For example, if processor A requested to access memory B, processor A puts a transaction start signal on bus 20A which includes a memory address that is within the address range of memory B. Bus control 24 monitors all control buses 20 and receives the transaction start and the address signal from bus 20A. Bus control 24 negates the bus grant signal on control line 20B to processor B and waits for any active transactions between processor B and memory B to clear, as evidenced by memory B controller sending an idle indication on bus 20B. Then bus control 24 causes switches 26A and 26B to close and issues a transaction start signal to memory controller B, which now receives, via the transfer bus, the address that processor A originally issued.

At this point, processor A is connected both to its own memory (memory A) and to memory B. If there are no further interruptions (that is, processor B does not request access to any memory and processor C accesses only its own memory) then bus control 24 does nothing, except to relay transaction start signals from processor A that are destined for memory B. Bus control 24 continues to monitor control lines 20A, 20B, and 20C and peripheral interface control 28. When bus control 24 sees a transaction start signal with an address for a memory spectrum that is not currently allocated to a particular processor, then bus control 24 consults its arbitration scheme for the next allowed transfer bus 22 access. For example, in the above scenario, processor A is currently connected to both memory A and memory B. If processor B issues a transaction start with an address for memory B on control line 20B, bus control 24 recognizes this request and immediately removes the bus grant from processor A. Bus control 24 waits for the idle signal from memory control B, opens the switches 26A and 26B and sends a bus grant signal to processor B. Simultaneously, bus control 24 returns the bus grant to processor A, which can also then initiate another transaction. Processor B can now, for the period of one memory transaction, access memory B. Processor B will be able to access its memory approximately 50 percent of the time when other processors are also requesting access to it according to this exemplary embodiment. In this way, processor B can still continue processing as quickly as possible while other processors are accessing its memory.

Figure 2:
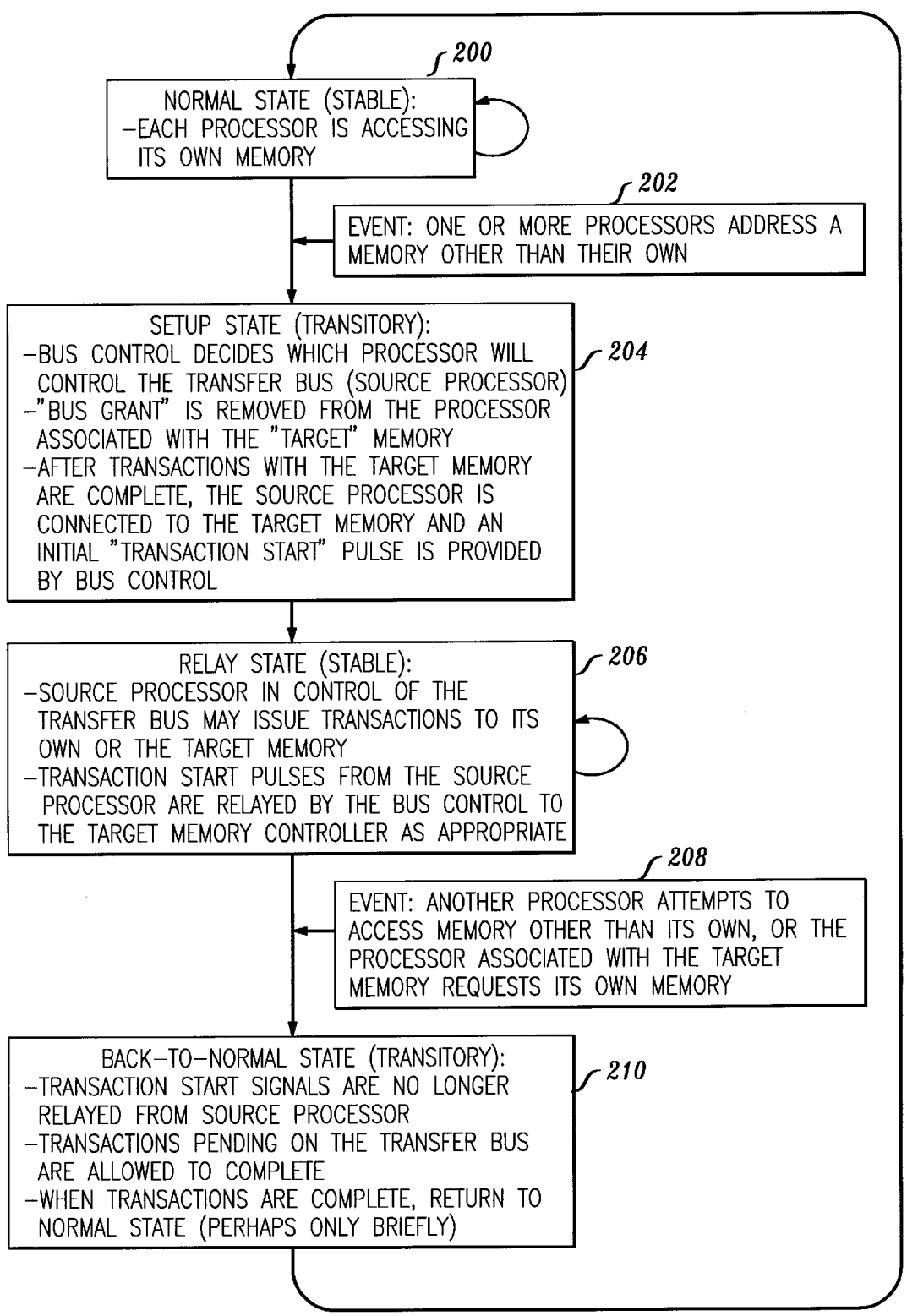
FIG. 2 is a high-level state diagram of the main states according to an exemplary embodiment of this invention.

Turning now to FIG. 2, a state diagram overview of processing in bus control 24 is shown. FIG. 2 is generally a state diagram indicating the actions taken in each state and the events which cause transitions from state to state. Processing starts in the "normal", stable state 200 where each processor is granted access to its own memory. In this state, processor A is granted access to memory A, processor B is granted access to memory B, and processor C is granted access to memory C. A transition event 202 occurs when one or more processors address a memory other than their own. This causes a transition to setup state 204 which is a transitory state. In the setup state, the bus control 24 decides which process will control the transfer bus by accessing its arbitration table. The bus grant signal is removed from the processor associated with the target memory. After any pending transaction between the processor associated with the target memory and the target memory is completed, as evidenced by issuance of an idle signal from the target memory controller, the source processor is connected to the target memory and a transaction start signal is provided by bus control 24 to the controller for the target memory.

After the transaction start signal is issued, bus control 24 transitions to the relay state 206, which is a stable state. In the relay state, the source processor in control of the transfer bus may issue transactions to its own memory or to the target memory. Transaction start signals from the winning processor are relayed by bus control 24 to the target memory controller when the address is within the address spectrum of the target memory. Processing remains in this state until an event 208 occurs wherein another processor attempts to access memory other than its own or the target processor requests its bus.

After event 208, another transitory state 210 is entered where transaction start signals are no longer relayed from the source processor to the target memory controller. Transactions pending on the transfer bus are allowed to complete. When the transactions are complete, the state transitions back to the normal state, but may only stay in the normal state briefly. A determination will be made in the normal state if there are one or more processors in a queue in bus control 24 that have addressed memories other than their own. If so, then processing again transitions into the set up state 204. Note that in each pass through the "normal" state, each processor is granted access to its own memory, and that transaction is allowed to complete. Hence, each processor is guaranteed access to its own memory at least 50% of the memory transactions.

Figure 3:
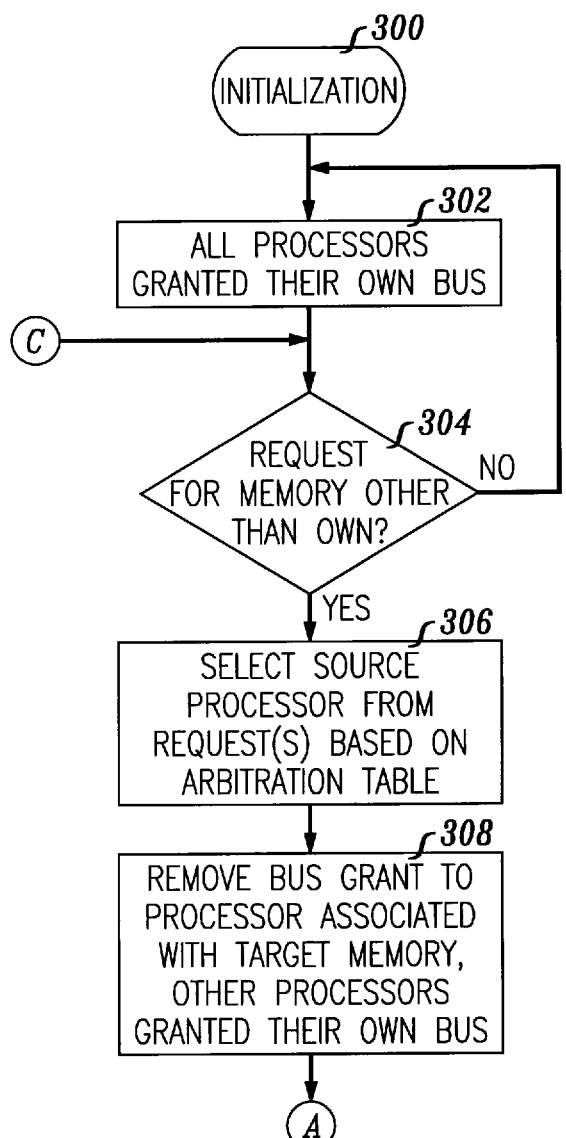
FIGS. 3–5 are a flow chart of the actions performed by the exemplary embodiment of FIG. 1.
Figure 4:
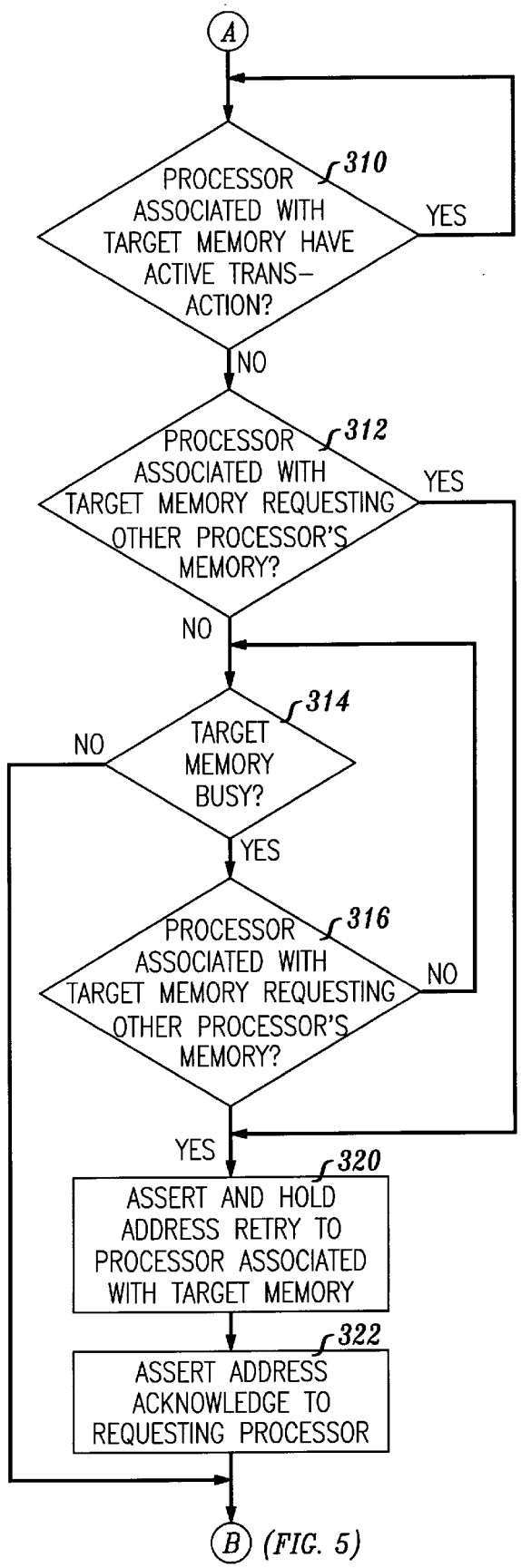
Figure 5:
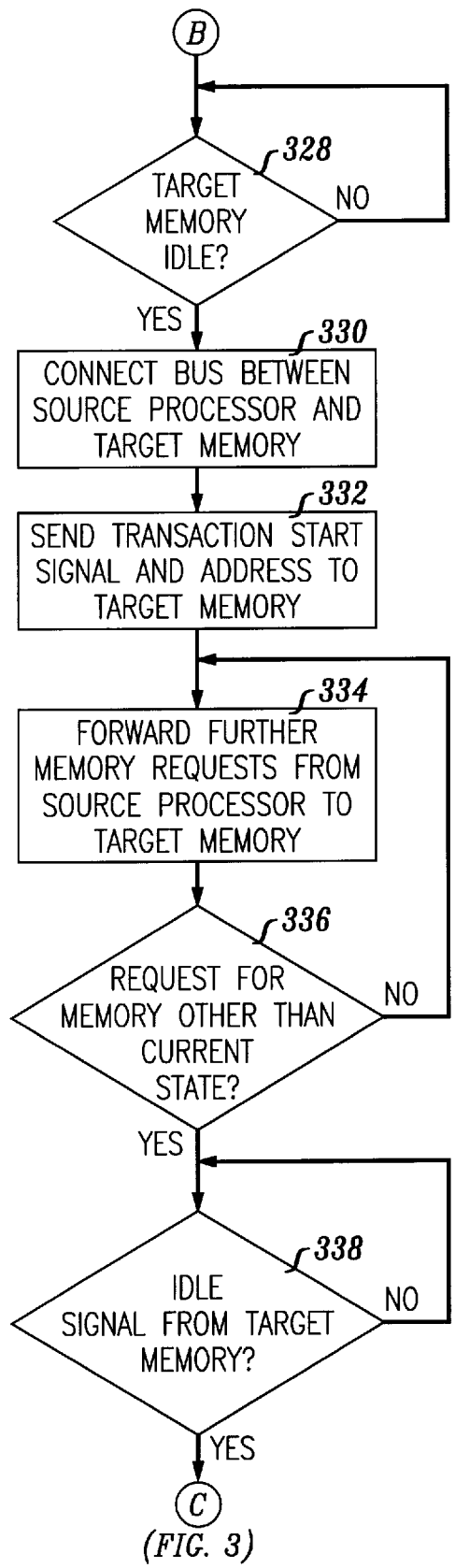

Turning now to FIGS. 3–5, flow charts of bus control 24 according to the state diagram of FIG. 2 is shown. Processing starts in circle 300, initialization. After initialization, processing moves to action box 302 where all processors are granted access to their own respective memories. In this exemplary embodiment, bus control 24 maintains a set of registers to record transaction start signals and the memory address of the transaction for each processor. The set of N registers (three in this exemplary embodiment) are monitored for requests for a memory location other than each processor's own memory spectrum in decision diamond 304. If such a request is not received, processing remains at action box 302 and decision diamond 304. If such a request is received, processing then transitions to action box 306. In action box 306, one of the requesting processors is selected (according to the arbitration table) to be the next source processor. The arbitration table uses the previous values of the source (processor) register and the values of the request registers to determine the new source processor wherein the "winner" is awarded access to the transfer bus.

Processing then moves to action box 308, where the bus grant signal is removed from the processor associated with the target memory of the new source processor. The other processors continue to receive the bus grant signal so that they can continue to access their own memories. Processing then continues through connector A to FIG. 4.

Turning now to FIG. 4, in decision diamond 310, a determination is made whether the target processor has a transaction pending at the same time that the bus grant signal is removed. If it does, then processing waits at decision diamond 310. Processing must generally wait for one clock cycle after removing the bus grant signal because the processor may have initiated a transaction on the same clock cycle. If there is no transaction pending in decision diamond 310, then processing moves to decision diamond 312 where a determination is made whether the target processor requested access to another memory. If it did, then processing moves to action box 320. In action box 320, bus control 24 asserts and holds an address retry signal to the processor associated with the target memory, which causes the target processor to abandon the transaction, even though it was already started. Processing then moves to action box 322, where bus control 24 asserts an address acknowledge signal to the requesting processor, because the processor requires an address acknowledge signal to accompany the address retry in this exemplary embodiment in order to abandon the transaction.

If, in decision diamond 312, the processor associated with the target memory is not requesting another processor's memory, then processing proceeds to decision diamond 314. In decision diamond 314, a determination is made whether the target memory is busy. If it is, then processing proceeds to decision diamond 316, where a determination is once again made whether the processor associated with the target memory is now requesting another processor's memory. If it is, then processing proceeds to action box 320, as above. If it is not making such a request, then processing proceeds back to decision diamond 314. Processing continues in this loop until bus control 24 receives the idle signal from the target memory's control (this is a second clock cycle to deal with the case where a transaction just started, bus was destined for another memory). Processing proceeds from both decision diamond 314 and action box 322 through connector B to FIG. 5.

Turning now to FIG. 5, processing continues to decision diamond 328. Again, the bus control waits until all pending transactions have completed, as indicated by the idle signal. The bus control may remain in this state for several clock periods since two memory transactions could be pending in the target memory controller at the same time. When all transactions have completed, that is, the idle signal has been received from the target memory controller in decision diamond 328, then processing proceeds to connect the bus between the source processor and destination memory in action box 330. Processing then proceeds to action box 332, where the transaction start signal for the requesting processor is sent from bus control 24 to the target memory controller.

Processing then proceeds to action box 334, where bus control 24 relays transaction start signals from the current source processor to the current target memory. Such events will not cause the request register in bus control 24 for the source processor to become active, but a transaction by the source processor destined for any other memory other than the target or its own memory will activate the request register for the source. It is possible for the current source processor to access its own memory. Since there are now two memory controllers connected to the processor, it is necessary to segregate in time the transactions of the two memories. To this end, each memory controller is equipped with an "idle out" and "idle in" signal. Each memory controller refrains from initiating a new access cycle until its "idle in" signal is active. When the buses are isolated, the bus arbiter supplies an active "idle in" signal to each of the memory controllers, but during the relay state, bus control 24 transfers the "idle out" signal from the source and target memory controllers to the target and source respectively processor's "idle in" signal. Processing proceeds to decision diamond 336, where a determination is made if any processor's request register became active, or if the target processor asserted its bus request signal.

Processing then proceeds to determine if the idle signal has been received in decision diamond 338. During this time, a transaction start signal from the current source processor will not be relayed to the target memory control, so that a new memory transaction cannot start. However, one may have just started. Since it takes two clock cycles for the resulting idle signal to be asserted, delay states are inserted. When the idle signal is asserted, it indicates that the memory is idle (has no transactions pending). It is then safe for processing to return to the normal state and possibly set up a new bus configuration. Processing then transitions back through connector C to decision diamond 304 in FIG. 3.

It is to be understood that the above-described embodiment is merely an illustrative principle of the invention and that many variations may be devised by those skilled in the art without departing from the scope of the invention. It is, therefore, intended that such variations be included within the scope of the claims.

The invention claimed is:

1. A system for providing high speed memory access in a processing system, said processing system comprising a plurality of processors, each of said plurality of processors issuing a transient transaction start signal to request a memory transaction, said system for providing high speed memory access in a processing system comprising:

a plurality of memories, each of said plurality of memories being associated with a predetermined one processor of said plurality of processors, each of said plurality of memories having an associated memory controller, each of said memory controllers issuing an idle signal upon completion of a memory transaction, each of said memories having a unique address spectrum for use by the memory's associated processor;

a plurality of buses, each of which directly connects each one of said plurality of processors to at least one of said plurality of memories, whereby each of said processors normally directly accesses its respective memory;

a transfer bus connectable to each of said plurality of buses; and a bus control means responsive to a transient transaction start signal having a duration no greater than 15 nanoseconds from any one of said processors to one of said memories other than said processor's respective memory, for monitoring said one of said memory controllers other than said processor's respective memory controller for said idle signal, and then providing said one processor access to said one memory at least one full clock cycle after said transient transaction start signal has been de-asserted via said transfer bus, said bus control means also for arbitrating among said plurality of processors when more than one processor requests access to a memory other than the processor's respective memory and for granting access to one or more of said plurality of memories to each of said processors;

means for receiving and storing said transient transaction start signal from a requesting one of said plurality of processors for access to one of said plurality of memories other than its own;

means for notifying a processor associated with said one of said plurality of memories other than the memory associated with said requesting processor and means for configuring said transfer bus so that said requesting processor may access said one of said plurality of memories other than its own responsive to receipt of said idle signal from said one of said plurality of memory controllers other than the memory controller associated with the memory of said requesting processor;

means for connecting said transfer bus to a host processor, said means for connecting to a host processor including notification means for informing said bus control means when said host processor requests access to one of said plurality of memories;

a plurality of switches interconnecting said transfer bus with each of said plurality of buses, said plurality of switches being under control of said bus control means; and a control line for sending said transient transaction start commands and memory addresses to said respective memory.

2. A system in accordance with claim 1 wherein each of said plurality of memories also has a separate address spectrum for use by the memory's respective processor.

3. A system in accordance with claim 1 wherein said bus control means includes bus grant means connected between said bus control means and each of said processors for said bus control to signal to each of said processors when it can access one or more of said plurality of memories besides its own respective memory.

4. A system in accordance with claim 1 wherein said bus control means includes means for forwarding requests for memory access from a requesting processor to a destination memory of one of said plurality of processors when said destination memory of one of said plurality of processors is not the requesting processor's respective memory.

5. A system in accordance with claim 1 further including a plurality of memory control means each connected between one of said plurality of control lines and one of said plurality of memories for interpretting commands and setting up a memory transaction responsive thereto.

* * * * *